(12) United States Patent
Fabre et al.

(10) Patent No.: US 11,437,688 B2
(45) Date of Patent: Sep. 6, 2022

(54) POWER CONNECTION DEVICE FOR AN ELECTRIC BATTERY AND CONNECTION ASSEMBLY COMPRISING THIS DEVICE

(71) Applicant: Aptiv Technologies Limited, St. Michael (BB)

(72) Inventors: Jean Fabre, Chartres (FR); Laurent Tristani, Margon (FR); Stephane Lacote, Chartres (FR)

(73) Assignee: Aptiv Technologies Limited, St. Michael (BB)

( * ) Notice: Subject to any disclaimer, the term of this patent is extended or adjusted under 35 U.S.C. 154(b) by 256 days.

(21) Appl. No.: 16/834,928

(22) Filed: Mar. 30, 2020

(65) Prior Publication Data
US 2020/0313142 A1   Oct. 1, 2020

(30) Foreign Application Priority Data

Apr. 1, 2019 (FR) ...................................... 1903478

(51) Int. Cl.
*H01M 50/502* (2021.01)
*H01R 4/48* (2006.01)
(Continued)

(52) U.S. Cl.
CPC ............ *H01M 50/502* (2021.01); *H01R 4/48* (2013.01); *H01R 11/288* (2013.01); *H01R 13/02* (2013.01); *H01R 31/06* (2013.01)

(58) Field of Classification Search
CPC ...... H01R 31/06; H01R 13/02; H01R 11/288; H01R 4/48; H01R 13/2464; H01R 13/113;
(Continued)

(56) References Cited

U.S. PATENT DOCUMENTS

| | | | | |
|---|---|---|---|---|
| 8,721,368 B2 * | 5/2014 | Zhao | ................... | H01M 50/502 439/627 |
| 8,859,897 B2 * | 10/2014 | Hadi | ..................... | H01R 25/14 174/70 B |

(Continued)

FOREIGN PATENT DOCUMENTS

| | | |
|---|---|---|
| CN | 103875094 | 6/2014 |
| CN | 106025647 | 10/2016 |

(Continued)

OTHER PUBLICATIONS

"French Search Report", FR Application No. 1902478, dated Feb. 5, 2020, 8 pages.

(Continued)

*Primary Examiner* — Oscar C Jimenez
*Assistant Examiner* — Paul D Baillargeon
(74) *Attorney, Agent, or Firm* — Colby Nipper PLLC

(57) ABSTRACT

Described is a power connection device of an electric battery including a cage, a busbar and a contact pad. The cage is made from a first material chosen for its mechanical properties and rigidity. The busbar and the pad are made from a second material chosen for its electrical conduction properties. The cage also comprises spring means designed to clamp at least a portion of a tab, inserted into the cage, against the pad. A connection assembly comprising the power connection device and a tab electrically connected to a battery cell is also described.

20 Claims, 3 Drawing Sheets

(51) Int. Cl.
  *H01R 11/28*  (2006.01)
  *H01R 13/02*  (2006.01)
  *H01R 31/06*  (2006.01)

(58) Field of Classification Search
  CPC .... H01R 13/114; H01R 13/187; H01R 13/15;
  H01M 50/502
  See application file for complete search history.

(56) References Cited

U.S. PATENT DOCUMENTS

| | | | |
|---|---|---|---|
| 9,722,328 B2* | 8/2017 | Wimmer | H01R 13/193 |
| 9,793,620 B2* | 10/2017 | Marsh | H01R 4/4809 |
| 10,389,055 B1* | 8/2019 | Lui | H01R 13/187 |
| 11,177,601 B2* | 11/2021 | Kitaoka | H01R 13/18 |
| 2003/0082957 A1 | 5/2003 | Mills et al. | |
| 2005/0112958 A1 | 5/2005 | Yagi et al. | |
| 2006/0234527 A1 | 10/2006 | Yagi et al. | |
| 2006/0270277 A1* | 11/2006 | Zhao | H01R 11/28 439/627 |

FOREIGN PATENT DOCUMENTS

| | | |
|---|---|---|
| CN | 106486791 | 3/2017 |
| FR | 3062956 | 8/2018 |
| JP | 2014116262 | 6/2014 |

OTHER PUBLICATIONS

"Extended European Search Report", EP Application No. 20167335.7, dated Jul. 20, 2020, 7 pages.

"Foreign Office Action", CN Application No. CN202010248810.4, dated Apr. 7, 2022, 14 pages.

* cited by examiner

POWER CONNECTION DEVICE FOR AN ELECTRIC BATTERY AND CONNECTION ASSEMBLY COMPRISING THIS DEVICE

RELATED APPLICATIONS

This application claims priority to a French patent application number 1903478, filed in France on Apr. 1, 2019, the entire content of which is incorporated by reference herein.

TECHNICAL FIELD

The invention relates to the field of battery connection technology. For example, the invention relates to connection devices making it possible to interconnect battery cells and notably battery cells for electric or rechargeable hybrid motor vehicles.

BACKGROUND

At present, batteries for electric or rechargeable hybrid motor vehicles are composed of packets of cells. The cells within these packets or between the packets are connected by means of busbars ("busbars" being the English term) fastened onto the cells using a screw and nut system. In order to increase the autonomy of the vehicles, one solution consists of increasing the number of interconnected cells. This therefore results in an increase in the number of nuts to be screwed and the consequences of this notably include an increase in the assembly time and the risk of having a busbar that is poorly screwed and therefore poorly connected (the number of screw turns, the screwing torques, etc. are not easily controllable parameters). Moreover, the current technology does not provide much flexibility in terms of tolerances. Moreover, given the high cost of the batteries in this type of vehicle, the quality problems which can result in having to change the battery must be avoided.

SUMMARY OF THE INVENTION

The purpose of the invention is to reduce, at least partially, at least one of the abovementioned disadvantages. For this purpose, according to the invention, a power connection device for an electric battery is proposed. This device comprises a busbar, at least one cage and at least one contact pad. Each cage itself comprises two walls (a first wall and a second wall) essentially parallel with and opposite each other. Each cage also comprises elastic means (these elastic means comprise for example a spring leaf extending away from one of the walls and designed to retain and compress the elements inserted in the cage against each other. The busbar comprises at least one end inserted in a cage. For example, at the level of this free end, the busbar is placed beside one of the two walls of this cage (the first wall), and/or against this wall, leaving a space between the busbar and the other wall (the second wall) of this cage. Each contact pad is made from an electrically conductive metal. Each contact pad is integral with the busbar, at the level of its end inserted in the cage. Each contact pad protrudes, in said space, on a surface of the busbar, towards the other wall of the cage (the second wall). The flexible means are designed to clamp, against a contact pad, at least a portion of a tab inserted into the cage between this contact pad and the second wall.

Thus, a conductive tab protruding on a battery cell can be inserted into a cage, in the space located between a contact pad and the wall which is opposite it. This tab is then held in the cage and pushed against the contact pad by the elastic means.

An electrical connection is thus formed between the tab and the busbar, by the intermediary of the contact pad, and this happens without having recourse to a screw and nut system.

Moreover, a cage can be made from a first material chosen for its mechanical properties and for its rigidity in particular. The busbar and the contact pad can be made from a second material chosen for its electrical conduction properties.

The connection device according to the invention possibly comprises one and/or the other of the features listed in claims 2 to 10, each considered independently of each other or in combination with one or more others.

According to another aspect, the invention relates to a connection assembly comprising a connection device such as mentioned above and a tab electrically connected to a battery cell. The tab is inserted in a cage between its contact pad and the wall of that cage opposite to the one against which the end of the busbar is placed, the elastic means maintaining at least a portion of the tab inserted into this cage clamped against the corresponding contact pad.

The tab inserted into the cage is possibly made from copper having a percentage purity greater than 99% according to the International Annealed Copper Standard ("ICAS").

BRIEF DESCRIPTION OF THE DRAWINGS

Other features, purposes and advantages of the invention will become apparent on reading the following detailed description given with reference to the appended drawings and by way of non-limiting examples and in which.

DETAILED DESCRIPTION

Figure 1:
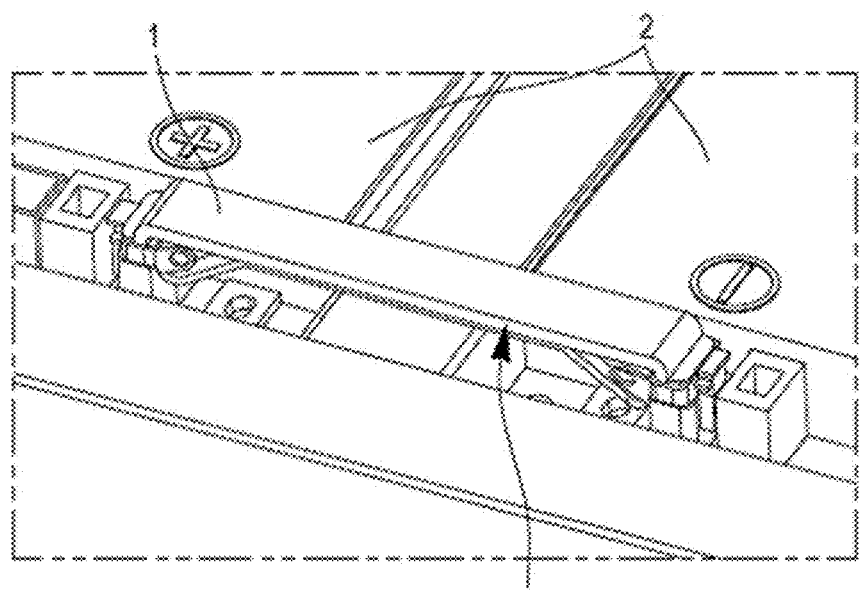
FIG. 1 is a diagrammatic representation in perspective of two battery cells connected together by an example of a connection device according to the invention.
Figure 2:
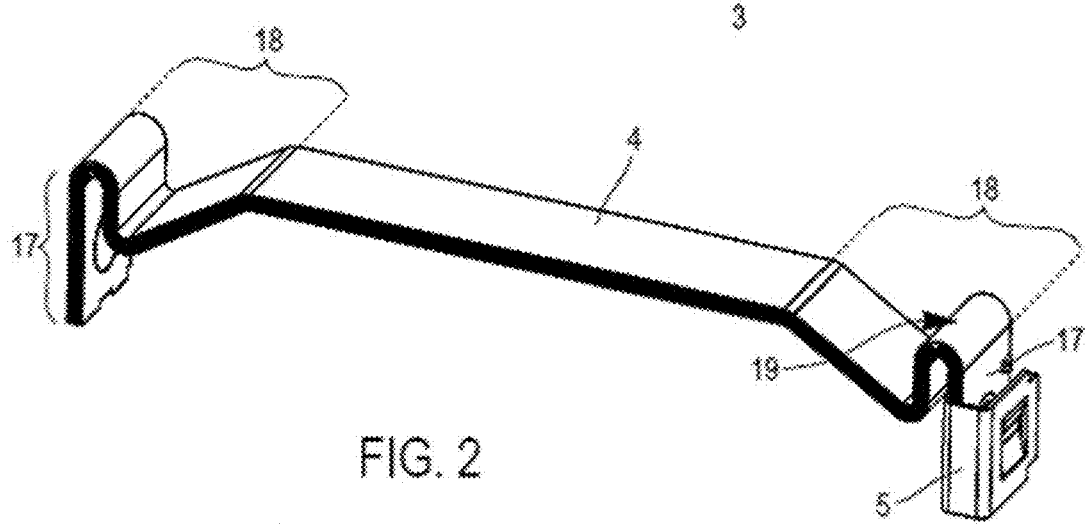
FIG. 2 is a diagrammatic representation in perspective of the busbar of the connection device shown in FIG. 1, this busbar being provided with a cage at each of its longitudinal ends.

An example embodiment of a connection assembly according to the invention is shown in FIG. 1. According to this example, the connection assembly electrically connects two poles, positive and negative respectively, of two battery cells 2. The connection assembly 1 comprises a connection device 1 and two tabs 15 (see a tab 15 in FIG. 8). It also comprises various casing components 3 notably intended to provide it with protection according to the IP2X standard. In fact, inside each casing 3 there is a busbar 4 provided with a cage 5 at each of its longitudinal ends (see FIG. 2—a single cage 5 is shown in FIG. 2). One of these ends is shown in greater detail and at another viewing angle in FIG. 3.

Each cage is formed by cutting and stamping from a sheet of stainless steel having a thickness of between 400 and 1200 micrometres. For example, it has a thickness of greater than or equal to 800 micrometres or greater than or equal to 1 millimetre.

Figure 4:
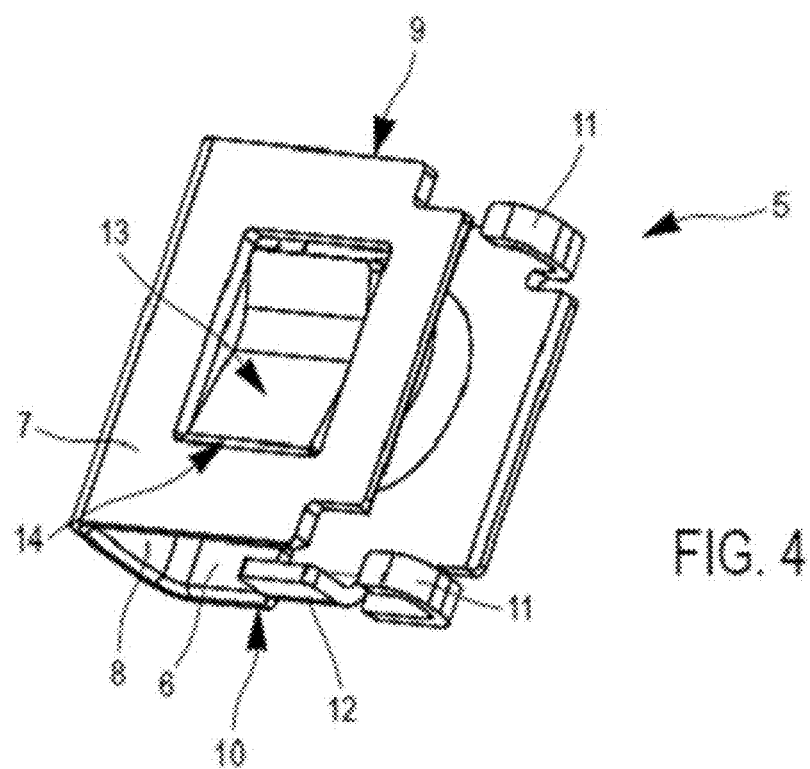
FIG. 4 is a diagrammatic representation in perspective of a cage such as the one fitted on the busbar shown in FIGS. 2 and 3.

As shown in FIG. 4, it has an overall "U" shape with two main walls, 6, 7 (corresponding to the uprights of the "U") and a connecting wall 8 (corresponding to the base of the "U"). The two main walls 6, 7 are essentially parallel. The connecting wall 8 extends essentially in a plane perpendicular to the main walls 6, 7. The connecting wall 8 connects the two main walls 6, 7 to each other. The cage 5 comprises an upper edge 9 and a lower edge 10 each respectively extending in a plane perpendicular to the main walls 6, 7 and to the connecting wall 8.

A first main wall 6 comprises, close to the upper edge 9 and lower edge 10 of the cage 5, a hook 11 turning back towards the interior of the cage. At the level of the lower edge 10, the cage 5 also comprises a lug 12 extending from the first wall 6, towards the interior of the cage 5. Alternatively, according to a variant which is not shown, the first main wall 6 comprises, on one side, a flange extending parallel to the connecting wall 8 and opposite the latter, and turning towards the interior of the cage 5.

A second main wall 7 comprises elastic means. More particularly, a rectangular or square spring leaf 13 is cut out in this second wall 7 on three sides and remains retained in the second wall 7 on a fourth side 14 which is not cut out. This fourth side 14 is essentially parallel with the lower edge 10 of the cage 5 and is located towards the lower edge 10. The spring leaf 13 is curved, starting from this fourth edge 14 towards the interior of the cage 5 and then again curved towards the second wall 7. Thus, a tab 15 inserted into the cage 5 can apply pressure onto the spring leaf 13 in such a way as to flatten it towards the second wall 7 and/or to push it back into the cut-out which has been produced in the second wall 7 in order to produce the spring leaf 13 (see FIG. 8 also).

Figure 3:
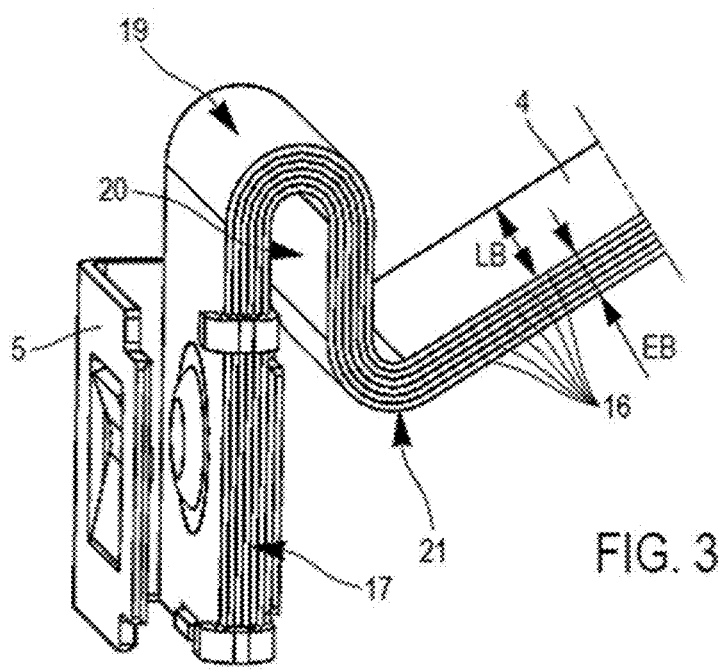
FIG. 3 is a diagrammatic representation in perspective of one end of the busbar shown in FIG. 2, provided with a cage.

The busbar 4 is formed of several layers 16 disposed one upon the other (see FIG. 3). For example, it is constituted by six layers 16. The technology used for producing the busbar is for example of type of that described in the European Patent application lodged with the reference number EP17207129. The width LB of the busbar 4 is between 15 and 25 millimetres. Preferably, it has a width LB of 23 millimetres. The thickness EB of the busbar is of the order of 3 millimetres. Each of the layers 16 is composed of copper having a percentage purity greater than 99% according to the International Annealed Copper Standard. It is thus suitable for conducting a current of 400 Amps without generating a heating up to higher than 65° C.

The busbar 4 comprises a free end with a connection portion, corresponding to the portion of the busbar 17 inserted into the cage 5 (see FIG. 2). The busbar 4 also comprises a flexible portion 18 extending the connection portion 17, to the outside of the cage 5. This flexible portion 18 comprises at least one elbow bend 19. For example, the flexible portion 18 comprises a bend 19 at 180°, in the shape of a "U", in such a way that a straight portion 20 turns back towards the cage 5 (see FIG. 3). This straight portion is essentially parallel with the first wall 6, in a plane passing outside of the cage 5 and opposite, with respect to the first wall 6, to the one in which the second wall 7 extends.

Close to the upper edge 9 of the cage 5, the straight portion 20 is followed by another bend 21 at about 45° of the straight portion 20, turning away from the cage 5. This configuration of the busbar 4 provides it with a certain flexibility to accommodate variations in the positions of the cells 2 with respect to each other. This therefore makes it possible to ensure the good positioning of a battery tab 15 in the cage 5 and therefore the good electrical contact of this tab 15 and the busbar 4. This is so whatever the tolerances in the positioning of the cells 2 in the battery may be (tolerances of a few millimetres, for example of the order of 2 millimetres can be compensated for thanks to the flexibility of the busbar 4).

Figure 5:
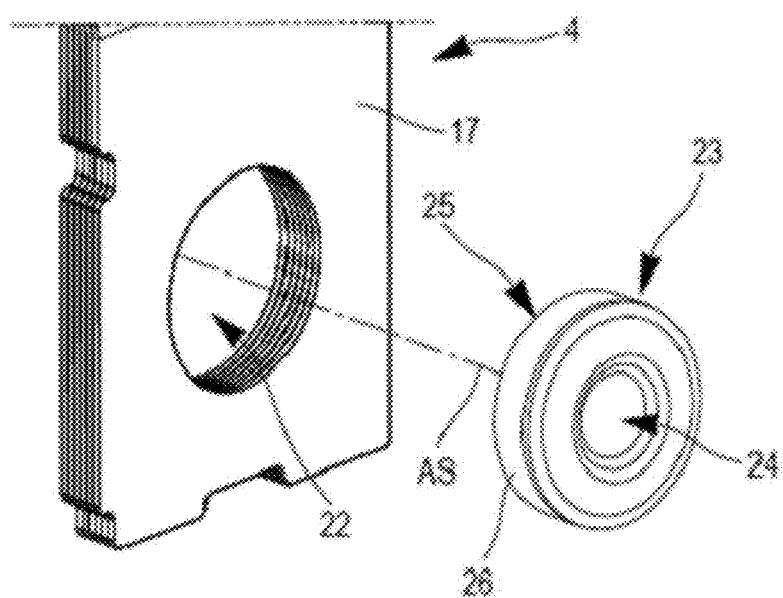
FIG. 5 is a diagrammatic exploded representation in perspective of one end of the busbar shown in FIGS. 2 and 3, with a contact pad intended to be mounted on it.

The busbar 4 comprises an opening 22 at the level of its connection portion 17 (see FIG. 5). It is a cylindrical hole with an axis AS of cylindrical symmetry essentially perpendicular to the plane of the connection portion 17. This hole passes through all of the constituent layers 16 of the busbar 4.

Figure 6:
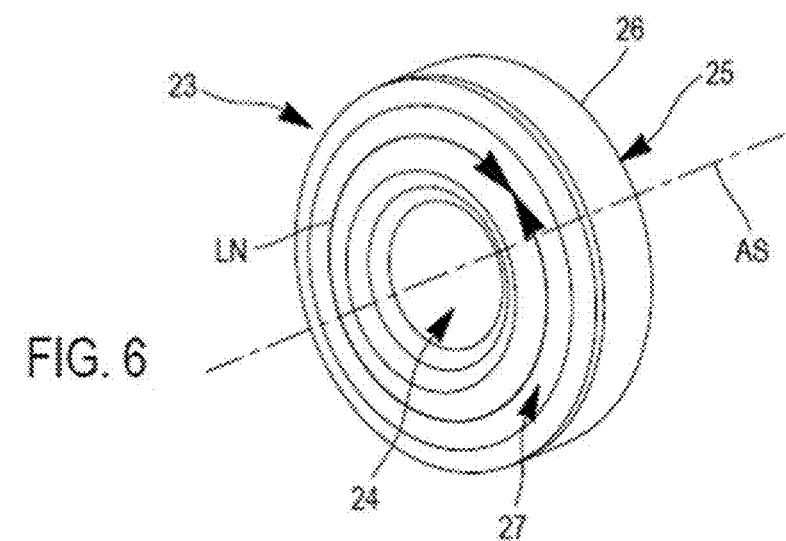
FIG. 6 is a diagrammatic representation in perspective of a contact pad as shown in FIG. 5.
Figure 7:
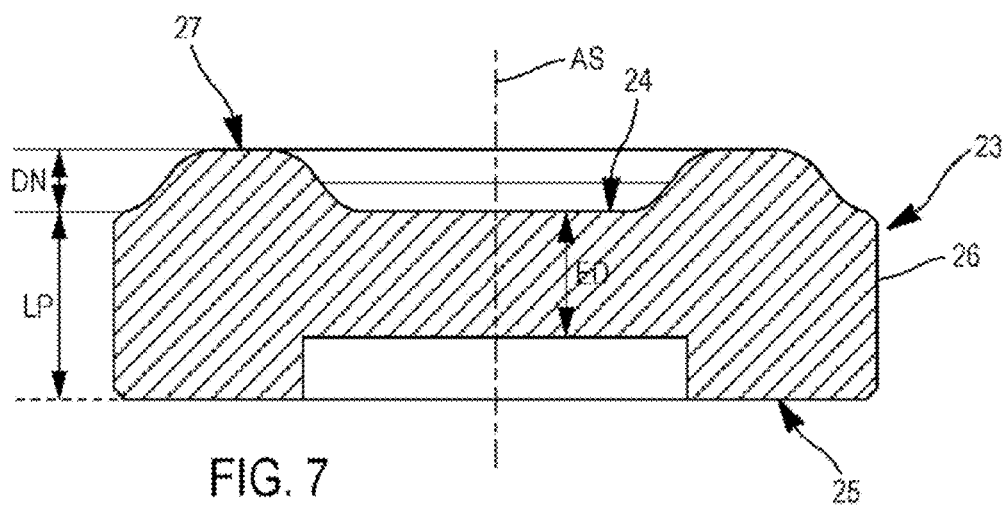
FIG. 7 is a diagrammatic representation in cross-section of the contact pad shown in FIG. 6.

A contact pad 23 is inserted into the opening 22. The pad 23 has a cylindrical revolution shape about a central axis (colinear with the axis of symmetry AS of the opening 22). It comprises a front face 24, a rear face 25 and an external cylindrical wall 26 extending between the rear face 25 and the front face 24 (see FIGS. 6 and 7). The cylindrical wall has a length LP sufficient to be in contact with each of the layers 16 of the busbar 4 in such a way that the current paths are distributed as uniformly as possible between the contact pad 23 and each of the layers 16. For example, the cylindrical wall has a length LP of the order of 3 millimetres (that is to say in a direction parallel with the central axis AS). The front face 24 is obturated by a disk whose thickness ED is of the order of 2 millimetres (that is to say in a direction parallel with the central axis AS). The front face 24 comprises a toroidal rib 27 extending over a distance DN of the order of 1 millimetre, starting from the front face 24 in a direction parallel with the central axis AS. The peak of the rib is flattened or rounded. For example, it is rounded with a curvature of 1.5 millimetres.

The rib 27 extends in a circular manner around the central axis AS over a length LN, for example greater than or equal to 24 millimetres. The rib 27 has a diameter greater than 3 millimetres, preferably greater than 6 millimetres, for example approximately equal to 8 millimetres.

The pad 23 is made of copper having a percentage purity greater than 99% according to the International Annealed Copper Standard (but it should be noted that with a copper alloy, having a percentage purity greater than 50% according to the International Annealed Copper Standard, it would also be possible to obtain acceptable results). It is covered, at least at the level of the rib 27 with a layer of electrodeposited silver of 1.5 to 5 micrometres, and advantageously greater than 3 micrometres. Thus, the contact resistance between the pad 23 and a tab 15 inserted into the cage 5 and pressed against the pad 23 with a normal force of 60 Newtons is of the order of 6 to 10 micro-ohms (for the described example, it is sought to obtain a Hertz pressure of 100 to 200 MPa).

The pad 23 is force-fitted in the opening 22 formed in the connection portion 17. Thus, the external cylindrical surface of the pad 23 is in contact with each of the constituent layers 16 of the busbar 4. The current paths passing through the pad 23 can therefore be distributed in the different layers 16. The circular distribution of the current paths around the external cylindrical wall 26 is also a factor having a positive influence by reducing the constriction resistance. The technology used, comprising the force-fitting of the pad 23 in an adjusted manner in the opening 22, which is itself produced by perforation of the layers 16 by punching, is a relatively simple technology to use industrially (in comparison with electric or ultrasonic welding), and makes it possible moreover to optimize the distribution of the current paths in the busbar. However, alternatively, other technologies (welding of a pad, deformation of at least one of the layers 16 in order in some way to form a pad 23 in one piece with the busbar 4, etc.) can still be envisaged according to variants of the invention.

The connection portion 17, provided with a pad 23 is inserted into the cage 5, by the upper edge 9. The busbar 4 is held in the cage 5 by means of the hooks 11 (possibly cooperating with notches formed in the busbar 4) and of the lug 12, against the first wall 6. The hooks 11 make it possible to clip the busbar 4 in the cage 5.

Figure 8:
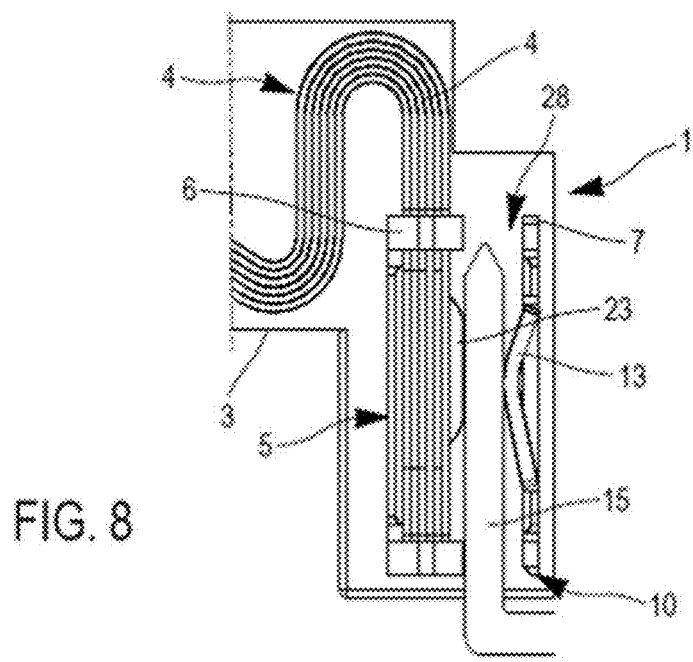
FIG. 8 is a diagrammatic representation in partial cross-section of the connection assembly shown in FIG. 1 with a tab inserted into the cage.

The connection device 1 is then obtained, a part of which is shown in FIG. 8. In the cage 5 of this device, a space 28 is formed between the busbar 4 and the second wall 7. Moreover, the pad 23 protrudes into this space 28. Thus, when a tab 15 is inserted into this space 28, at the level of the lower edge 10 of the cage 5, it interacts on the one had with the spring leaf 13 and on the other hand with the rib 27 of the pad 23 upon which it is pressed by the spring leaf 13. The spring leaf 13 is designed to apply a force of 60 Newtons onto the tab 15.

As indicated above, the cage 5 is formed from a sheet of stainless steel whilst the pad 23 is formed from copper having a high degree of purity. Stainless steel is mechanically more rigid than copper (which is relatively ductile) but it is as good a conductor as copper having a high degree of purity. According to the invention, it is therefore possible to benefit from a rigid cage 5, which provides a high contact force but which does not take part in the electrical conduction, and a good electrical connection between the pad 23 and the tab 15 on the one hand and between the pad 23 and the busbar 4 on the other hand. Moreover, the deposit of a layer of silver, which further improves the conductivity at the level of the contact between the rib 27 and the tab 15, is limited to the pad 23 so as to limit the manufacturing cost of the device according to the invention, if such a layer of silver is used.

Moreover, another decoupling is produced between the functions, on the one hand, of the cage 5 which firmly maintains, one upon the other, the busbar 4 and a tab 15, with a high normal force, and, on the other hand, of the busbar 4 which, with its flexible portion 18, makes it possible to accommodate the tolerances.

The electrical connection, at the level of the connection assembly, between the connection device 1 and the tab 15 can be further improved if the tab 15 is made from copper having a purity greater than 99% according to the International Annealed Copper Standard. In this connection assembly, the current flows through various components made of copper having a purity greater than 99% according to the International Annealed Copper Standard.

What is claimed is:

1. A power connection device for an electric battery comprising:
    at least one cage comprising a first wall and a second wall opposite each other, as well as spring means; and
    a current conducting busbar comprising at least one end inserted into the cage leaving a space between the busbar and the second wall,
    the current conducting busbar including at least one contact pad made from an electrically conductive metal, the contact pad comprising a cylindrical revolution shape about a cylindrical axis, the contact pad inserted in an opening formed in the busbar at a level of its end inserted into the cage, the contact pad protruding on a face of the busbar towards the second wall of the cage, the spring means configured to clamp against the contact pad, at least a portion of a tab inserted into the cage between the contact pad and the second wall.

2. The connection device of claim 1, wherein the pad is made from copper having a percentage purity greater than 99% according to the International Annealed Copper Standard.

3. The connection device of claim 1, wherein the pad comprises a contact zone covered with a layer of silver whose thickness is between 1 and 10 micrometres.

4. The connection device of claim 1, wherein the pad has a toroidal rib extending in a plane essentially parallel with the first wall and the second wall of the cage.

5. The connection device of claim 1, wherein the busbar is made from copper having a percentage purity greater than 99% according to the International Annealed Copper Standard.

6. The connection device of claim 1, wherein the busbar is formed by several stacked strips.

7. The connection device of claim 1, wherein the busbar comprises at least one flexible portion which extends the end inserted into the cage, this flexible portion comprising at least one elbow bend.

8. The connection device of claim 1, wherein the pad is inserted into the opening formed in the busbar by force-fitting the pad in the opening formed in the busbar.

9. The connection device of claim 1, wherein the cage is made from stainless steel.

10. The connection device of claim 1, wherein the cage is made from sheet steel having a thickness greater than or equal to 800 micrometres.

11. A connection assembly comprising:
    a connection device for a battery, the connection device including:
        at least one cage comprising a first wall and a second wall opposite each other, as well as spring means;
        a current conducting busbar comprising at least one end inserted into the cage leaving a space between the busbar and the second wall;
        the current conducting busbar including at least one contact pad made from an electrically conductive metal, the contact pad comprising a cylindrical revolution shape about a cylindrical axis, the contact pad inserted in an opening formed in the busbar at a level of its end inserted into the cage, the contact pad protruding on a face of the busbar towards the second wall of the cage, the spring means configured to clamp against the contact pad, at least a portion of a tab inserted into the cage between the contact pad and the second wall; and
    the tab inserted into the cage between the pad and the wall of the cage opposite to the one against which the end of the busbar is placed.

12. The connection assembly of claim 11, wherein the tab is made from copper having a percentage purity greater than 99% according to the International Annealed Copper Standard.

13. A power connection device for an electric battery comprising:
　at least one cage comprising:
　　a first wall;
　　a second wall opposite the first wall; and
　　spring means; and
　a current conducting busbar comprising:
　　at least one end inserted into the cage leaving a space between the busbar and the second wall;
　　at least one contact pad made from an electrically conductive metal, integral with the busbar at a level of its end inserted into the cage, the contact pad protruding on a face of the busbar towards the second wall of the cage, wherein the contact pad further comprises a toroidal rib extending in a plane parallel with the first wall and the second wall of the cage; and
　　at least a portion of a tab inserted into the cage between the contact pad and the second wall,
　　wherein the spring means is configured to clamp against the contact pad.

14. The power connection device of claim 13, wherein the contact pad is made from copper having a percentage purity greater than 99% according to the International Annealed Copper Standard.

15. The power connection device of claim 13, wherein the contact pad comprises a contact zone covered with a layer of silver whose thickness is between 1 and 10 micrometres.

16. The power connection device of claim 13, wherein the busbar is made from copper having a percentage purity greater than 99% according to the International Annealed Copper Standard.

17. The power connection device of claim 13, wherein the busbar is formed by several stacked strips.

18. The power connection device of claim 13, wherein the busbar comprises at least one flexible portion which extends the end inserted into the cage, this flexible portion comprising at least one elbow bend.

19. The power connection device of claim 13, wherein the contact pad is integral with the busbar through the pad being welded into an opening formed in the busbar.

20. The power connection device of claim 19, wherein the contact pad is circular and the opening formed in the busbar is circular.

* * * * *